United States Patent
Kuehn et al.

(10) Patent No.: US 7,501,367 B2
(45) Date of Patent: Mar. 10, 2009

(54) OPTICAL COMPONENT OF QUARTZ GLASS, METHOD FOR PRODUCING SAID COMPONENT, AND METHOD FOR EXPOSING A SUBSTRATE

(75) Inventors: Bodo Kuehn, Hanau (DE); Stephan Ochs, Bad Camberg (DE); Steffen Kaiser, Hanau (DE); Denis Kassube, Rodenbach (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 113 days.

(21) Appl. No.: 11/403,267

(22) Filed: Apr. 13, 2006

(65) Prior Publication Data

US 2006/0234848 A1    Oct. 19, 2006

(30) Foreign Application Priority Data

Apr. 15, 2005   (DE) .................. 10 2005 017 752

(51) Int. Cl.
C03C 3/06   (2006.01)
(52) U.S. Cl. .............................. 501/54
(58) Field of Classification Search .............. 501/54
See application file for complete search history.

(56) References Cited

U.S. PATENT DOCUMENTS

| | | | |
|---|---|---|---|
| 6,544,914 B1 * | 4/2003 | Kikugawa et al. ........... 501/54 |
| 6,576,578 B1 * | 6/2003 | Ikuta et al. ................. 501/54 |
| 6,761,951 B2 | 7/2004 | Otsuka et al. | |
| 6,849,242 B1 * | 2/2005 | Koeppler et al. .......... 423/338 |
| 2003/0115904 A1 * | 6/2003 | Kuhn et al. ................. 65/17.6 |
| 2003/0115905 A1 | 6/2003 | Kuhn et al. | |
| 2003/0119652 A1 | 6/2003 | Kuhn et al. | |

FOREIGN PATENT DOCUMENTS

| | | |
|---|---|---|
| DE | 101 59 959 A1 | 6/2003 |
| DE | 101 59 961 A1 | 6/2003 |
| DE | 101 59 962 A1 | 7/2003 |
| DE | 102 10 899 A1 | 9/2003 |

* cited by examiner

*Primary Examiner*—Karl E Group
*Assistant Examiner*—Noah S Wiese
(74) *Attorney, Agent, or Firm*—Tiajoloff & Kelly

(57) ABSTRACT

To provide an optical component of quartz glass for use in a projection lens system for immersion lithography with an operating wavelength below 250 nm, which is optimized for use with linearly polarized UV laser radiation and particularly with respect to compaction and birefringence induced by anisotropic density change, it is suggested according to the invention that the quartz glass should show the combination of several properties: particularly a glass structure essentially without oxygen defects, a mean content of hydroxyl groups of less than 60 wt ppm, a mean content of fluorine of less than 10 wt ppm, a mean content of chlorine of less than 1 wt ppm. A method for producing such an optical component comprises the following method steps: producing and drying an $SiO_2$ soot body under reducing conditions and treating the dried soot body before or during vitrification with a reagent reacting with oxygen defects of the quartz glass structure.

6 Claims, 3 Drawing Sheets

Figure 1:
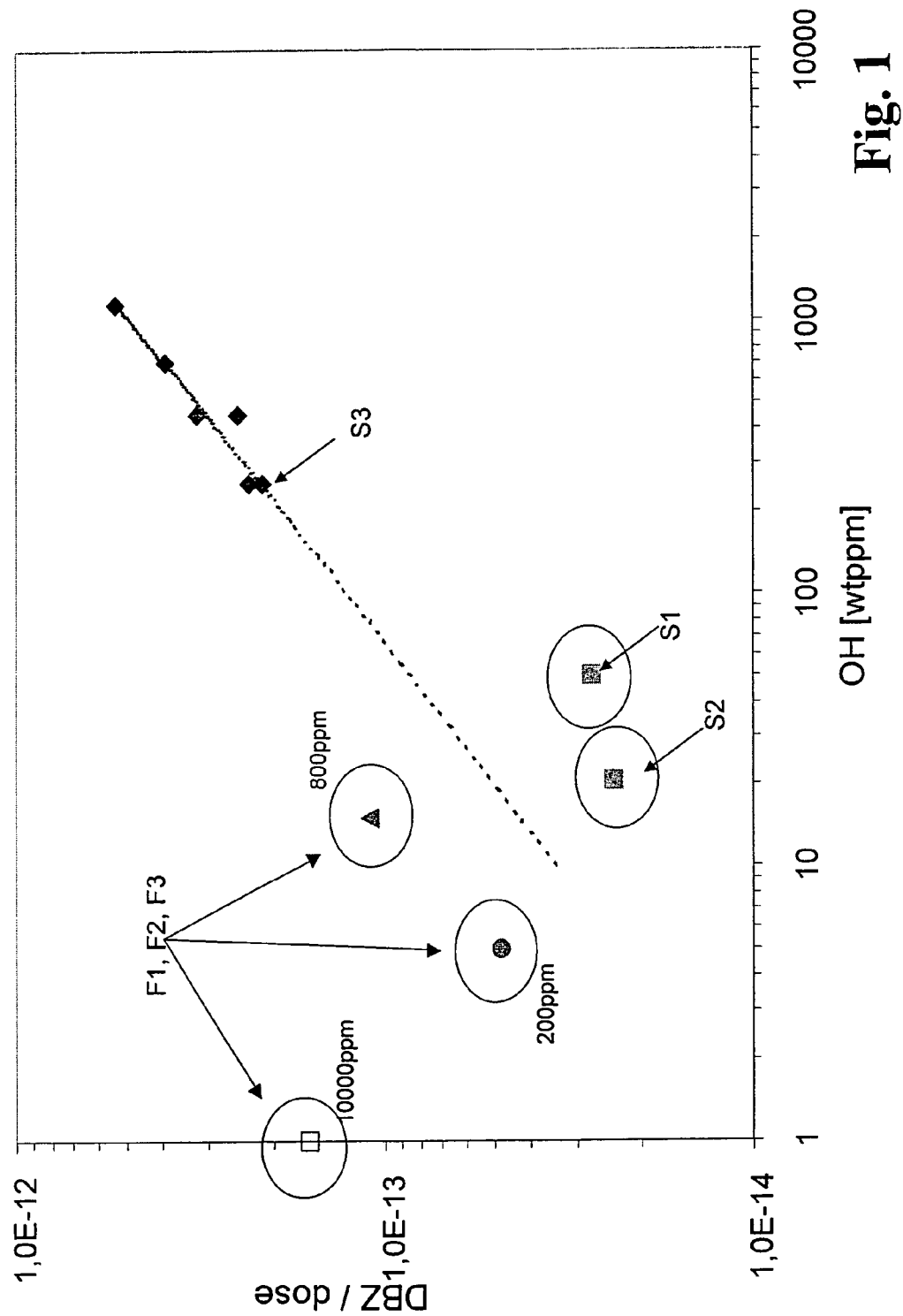

OPTICAL COMPONENT OF QUARTZ GLASS, METHOD FOR PRODUCING SAID COMPONENT, AND METHOD FOR EXPOSING A SUBSTRATE

The present invention relates to an optical component of quartz glass for use in a projection lens system for immersion lithography with an operating wavelength below 250 nm.

Furthermore, the present invention relates to a method for producing such an optical component of quartz glass and to the use thereof.

Optical components made of quartz glass are used for transmitting high-energy ultraviolet laser radiation in microlithographic exposure and projections systems for producing large-scale integrated circuits on substrates. Modern microlithographic projection systems operate with excimer lasers emitting high-energy pulsed UV radiation of a wavelength of 248 nm (KrF laser) or 193 nm (ArF laser). The general demand is here made that the light distribution provided in the area of an object plane of the lighting system should be transmitted as homogeneously as possible and in an angle-maintaining manner and with the highest resolution possible into an image plane of the projection lens system conjugated relative to the object plane on the substrate to be exposed.

Each change in the angular spectrum that is created in the optical path leads to a distortion of the intensity distribution in the lens pupil, which leads to an asymmetrical irradiation and thus to a deterioration of the imaging performance.

In this context birefringence of the quartz glass plays an important role because it impairs the imaging fidelity of optical components of quartz glass. Birefringence is created during inhomogeneous cooling of the blank used for the optical component to be produced, or it is induced by UV irradiation in that structural defects are created leading to a density change.

An anisotropic density change induced by UV radiation is particularly noticed in projection systems operating according to the so-called "immersion lithography" technique. In immersion lithography the gap between the substrate to be exposed in the image plane and the last optical component of the lens system is filled with a liquid having a higher refractive index than air. The higher refractive index of the liquid in comparison with air effects a larger numerical aperture of the projection lens system on the whole, thereby improving the resolution of the system.

DE 102 10 899 A1 discloses a refractive projection lens system for use in microlithography on the basis of immersion technique, the system consisting of a number of lens groups having different optical properties. Synthetic quartz glass is suggested as the lens material for an operating wavelength of 193 nm and calcium fluoride for an operating wavelength of 157 nm. The gap between the last lens of the system and the substrate has a width of 8.4 mm, and it is filled by an immersion liquid in the form of deionized water, the refractive index of which is said to be 1.47. No further information is furnished on the quartz glass of the last lens of the projection lens system.

"Immersion lithography" is, however, sensitive to polarization; the best results are obtained when linearly polarized laser radiation is used and not, as is otherwise standard, completely or partly circularly polarized laser radiation. It has been found that linearly polarized UV radiation causes an anisotropic density change in the quartz glass, which leads to induced stress birefringence also in regions that would not show any change under circularly polarized radiation.

Measures for reducing the effect of anisotropic density change are described in the non-published German patent application DE 10 2004 017 031, which pertains to the present patent application within the meaning of § 3 (2) German Patent Act. However it has been found that a factor not indicated in said application has an impact on anisotropic density change.

A quartz glass blank for an optical component for use in a projection lens system for microlithography with an operating wavelength around 193 nm is also described in DE 101 59 961 C2. The known component consists of quartz glass having a glass structure essentially free of oxygen defects, and a hydrogen content in the range of $0.1 \times 10^{16}$ molecules/cm$^3$ to $4.0 \times 10^{16}$ molecules/cm$^3$, a hydroxyl group content in the range of 125 wt ppm to 450 wt ppm, a content of SiH groups of less than $5 \times 10^{16}$ molecules/cm$^3$.

This component shows a relatively high hydroxyl group content and is suited for use in a projection lens system for immersion lithography with an operating wavelength below 250 nm only to a limited degree.

It is the object of the present invention to provide an optical component which is particularly well suited for use with linearly polarized UV laser radiation and which is optimized with respect to compaction and birefringence induced by anisotropic density change. Moreover, it is the object of the present invention to provide a method for producing such an optical component.

As for the optical component, said object is achieved according to the invention by an embodiment of the component in which the quartz glass shows the combination of the following characteristics:

a glass structure essentially without oxygen defects, a mean hydrogen content in the range between $1 \times 10^{16}$ and $1 \times 10^{17}$ molecules/cm$^3$, a mean content of SiH groups of less than $5 \times 10^{16}$ molecules/cm$^3$, a mean content of hydroxyl groups of less than 60 wt ppm, a mean content of fluorine of less than 10 wt ppm, a mean content of chlorine of less than 1 wt ppm, and a fictive temperature above 1040° C.

Ideally, the said properties are constant over the used volume of the optical component and the indicated components are evenly distributed. The above details, however, refer to mean values of the properties within the optically used range of the component (also designated as "CA (clear aperture) area" or "optically used volume").

A glass structure that is substantially free from oxygen defects is here understood to be a glass structure in which the concentrations of oxygen deficiency defects and oxygen excess defects are below the detection limit of the method of Shelby. Said detection method is published in "Reaction of hydrogen with hydroxyl-free vitreous silica" (J. Appl. Phys. Vol. 51, No. 5 (May 1980), pp. 2589-2593). Quantitatively, this yields a number of oxygen deficiency defects or oxygen excess defects in the glass structure of not more than $10^{17}$ per gram quartz glass.

The hydrogen content (H$_2$ content) is determined by way of a Raman measurement, which was first suggested by Khotimchenko et al. ("Determining the Content of Hydrogen Dissolved in Quartz Glass Using the Methods of Raman Scattering and Mass Spectrometry" Zhurnal Prikladnoi Spektroskopii, Vol. 46, No. 6 (June 1987), pp. 987-991).

The content of SiH groups is determined by means of Raman spectroscopy, a calibration being carried out on the basis of a chemical reaction: Si—O—Si+H$_2$→Si—H+Si—

OH, as described in Shelby "Reaction of hydrogen with hydroxyl-free vitreous silica" (J. Appl. Phys., Vol. 51, No. 5 (May 1980), pp. 2589-2593).

The hydroxyl group content (OH content) follows from a measurement of the IR absorption according to the method of D. M. Dodd et al. ("Optical Determinations of OH in Fused Silica", (1966), p. 3911).

The fictive temperature is a parameter which characterizes the specific network structure of the quartz glass. A standard measuring method for determining the fictive temperature by way of a measurement of the Raman scattering intensity at a wavelength of about 606 cm$^{-1}$ is described in "Ch. Pfleiderer et al.: "The UV-induced 210 nm absorption band in fused silica with different thermal history and stoichiometry"; J. Non-Cryst. Solids 159 (1993) 145-143".

The quartz glass described in DE 10 2005 017 031 is obtained in that an $SiO_2$ soot body produced by flame hydrolysis of $SiCl_4$ with the help of the known VAD method is dehydrated at a temperature of 1200° C. in a chlorine-containing atmosphere and is then vitrified at a temperature of about 1750° C. in vacuum ($10^{-2}$ mbar) to obtain a transparent quartz glass blank.

Chlorine can easily substitute hydroxyl groups in the quartz glass network, so that the content thereof can be reduced relatively easily to very low values by this type of dehydration treatment. In this process, however, chlorine is incorporated into the glass network structure, which may affect UV radiation resistance. A similar situation is observed during dehydration by means of other halogens or their compounds. On the other hand, a purely physical, and not chemically supported, decrease in the hydroxyl group content to values below 60 wt ppm requires long treatment periods at high temperatures. It has been found that rearrangements of the glass structure and defect formations may take place, which particularly lead to oxygen defects, and one reason therefor might be that an appropriate substituent is not directly available for the removed OH groups. The oxygen defects produced in this way also impair the UV radiation resistance of the quartz glass. Hence, the problem consists in providing an adequately dried $SiO_2$ soot body without any substantial halogen content, whose glass structure shows no or only a few oxygen defects. Measures suited therefor shall be explained in more detail further below with reference to the method of the invention.

The quartz glass of the component according to the present invention therefore differs from the quartz glass known from DE 10 2004 017 031 in that despite a low hydroxyl group content of less than 60 wt ppm its glass structure is substantially free from oxygen defects, and the halogen content is low at the same time. The chlorine content of the quartz glass is particularly less than 1 wt ppm.

It has been found that an optical component made from a quartz glass having the above-indicated properties will only experience a small anisotropic density change upon use with linearly polarized UV laser radiation.

Apart from the above-explained measures, this effect is said to be due to the comparatively low hydroxyl group content of the quartz glass and its relatively high fictive temperature. With a decreasing hydroxyl group content of a quartz glass the viscosity thereof is increasing. On the other hand, it is known that quartz glass (with a high fictive temperature) which is rapidly cooled from the temperature range between 1000° C. and 1500° C. has a lower specific volume and thus a higher specific density than quartz glass (with a low fictive temperature) which is cooled at a slow rate. According to "R. Brückner, Silicon Dioxide; Encyclopedia of Applied Physics, Vol. 18 (1997), pp. 101-131", this effect is due to an anomaly of synthetic quartz glass in the case of which the evolution of the specific volume in the range between 1000° C. and 1500° C. has a negative temperature coefficient, i.e., the specific volume of quartz glass increases in this temperature range with a decreasing temperature, or in other words, the quartz glass rapidly cooled from the said temperature range and having a high fictive temperature shows a higher density than quartz glass which is cooled at a slow rate and has a low fictive temperature.

The density of the quartz glass which is also higher due to the higher fictive temperature acts like an "anticipated" compaction of the glass structure on the whole. In this respect the compact network structure counteracts the effect of a local isotropic density change upon UV radiation.

Apart from enhanced viscosity, the low OH content may also show another important aspect with respect to the prevention of an anisotropic density change. It is assumed that the change in density is accompanied by a rearrangement of hydroxyl groups, this rearrangement mechanism being all the more likely and easier the more hydroxyl groups are available. The low hydroxyl group content and the increased density (high fictive temperature) of the quartz glass therefore reduce the sensitivity of the glass structure to a local anisotropic density change.

The quartz glass component of the invention thus withstands UV radiation in a better way than the known quartz glass qualities, so that it is particularly well suited for use in the transmission of linearly polarized UV radiation having a wavelength of between 190 nm and 250 nm.

It has turned out to be particularly advantageous when the quartz glass has a fictive temperature above 1080° C.

The higher the fictive temperature of the quartz glass, the higher is its density and the more pronounced the above-described effect of the "anticipated" compaction of the quartz glass on the whole, and thus the resistance to a local anisotropic and isotropic density increase by linearly polarized UV radiation. At very high fictive temperatures (>1200° C.) this positive effect, however, may be impaired by an excessively high and thermally created stress birefringence.

As for a high viscosity of the quartz glass, preference is given to an embodiment of the optical component in which the quartz glass has a content of hydroxyl groups between 10 and 30 wt ppm.

The low hydroxyl group content creates enhanced viscosity. The accompanying improvement of the behavior over a local isotropic density change is surprising insofar as it is assumed in the above-mentioned DE 101 59 961 C2 that a quartz glass having a hydroxyl group content of less than 125 wt ppm, as is typical of the quartz glass produced according to the soot method, tends to compaction.

The viscosity increasing effect of the comparatively low hydroxyl group content can be compensated by a high fluorine content either completely or in part. It can also be assumed that, similar to Si—OH groups, Si—F groups can be easily rearranged when subjected to UV radiation, thereby effecting density changes. Therefore, the quartz glass for the optical component of the invention has preferably a content of fluorine of less than 5 wt ppm.

Moreover, it has turned out to be advantageous when the mean hydrogen content of the quartz glass is below $5\times10^{16}$ molecules/cm$^3$, preferably between $2\times10^{16}$ and $5\times10^{16}$ molecules/cm$^3$.

The higher the hydrogen content, the greater is its defect-healing effect upon UV radiation. On the other hand, the hydrogen content may contribute to the generation of SiH-Groups. Accordingly, said upper limit for the hydrogen content is due to the fact that at a high hydrogen content the risk of SiH formation through the reaction

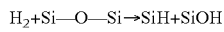

is increasing.

As for the method, the above-indicated object is achieved according to the invention by a method comprising the following steps:

producing an $SiO_2$ soot body, drying the soot body at a temperature of at least 1150° C. under vacuum or under inert gas and under reducing conditions in such a manner that a mean hydroxyl group content of less than 60 wt ppm is obtained, treating the dried soot body with a reagent reacting with oxygen defects of the quartz glass structure, vitrifying the soot body with formation of a cylindrical quartz glass blank, annealing the quartz glass blank with formation of a quartz glass cylinder at a fictive temperature above 1040° C., preferably above 1080° C., which surrounds a contour of the optical component to be produced with an overdimension, removing part of the axial overdimension in the area of the faces of the quartz glass cylinder, and loading the quartz glass cylinder with hydrogen by heating in a hydrogen-containing atmosphere at a temperature below 500° C. with generation of a mean hydrogen content in the range of $1\times10^{16}$ molecules/cm$^3$ to $1\times10^{17}$ molecules/cm$^3$.

"Direct vitrification" normally yields quartz glass having an OH content of 450 to 1200 wt ppm, whereas rather low OH contents ranging between a few wt ppm and 300 wt ppm are typical of quartz glass produced according to the "soot method". The quartz glass for the optical component according to the invention is therefore preferably produced by means of the "soot method". In this method an $SiO_2$ soot body is produced as an intermediate product having a hydroxyl group content that can be adjusted in a simple way to a predetermined value through a dehydration treatment.

The dehydration treatment comprises drying the soot body at a temperature of at least 1150° C. under vacuum or an inert gas and under reducing conditions such that a mean hydroxyl group content of less than 60 wt ppm is obtained. Thanks to this thermal dehydration treatment an excessive introduction of halogens into the soot body during substitution of hydroxyl groups is avoided. On the other hand, the lengthy thermal treatment under reducing conditions creates oxygen defects because a suitable substituent is not directly available for the removed OH groups. The oxygen defects impair the UV radiation resistance of the quartz glass.

According to the invention an aftertreatment of the soot body is therefore provided for reducing the oxygen defects. In this process the dried soot body is treated with a reagent reacting with the oxygen defects of the quartz glass structure. The activation energy for this reaction is provided in that the soot body is heated to an appropriately high temperature which depends on the reagent used.

The aftertreatment can be carried out before or together with the vitrification of the soot body. After vitrification a quartz glass blank is obtained with a hydroxyl group content of less than 60 wt ppm, the blank being substantially free from oxygen defects, SiH groups and hydrogen (the content of all of these components is below the detection limit).

The quartz glass blank is subsequently annealed, attention being paid to the adjustment of a fictive temperature above 1040° C., preferably above 1080° C. The predetermined fictive temperature can be maintained by the measures that the quartz glass blank is held at a temperature within the range of the desired fictive temperature until the setting of the structural balance and is then cooled rapidly, or that the blank is cooled at a sufficiently fast rate from a temperature above the fictive temperature to be set. Attention must here be paid on the one hand that the desired high fictive temperature is maintained and that no stress birefringence is produced on the other hand. The one precondition (high fictive temperature) is taken into account through the lower limit of a cooling rate, and the other precondition (low stress birefringence) through a corresponding lower limit which will be explained in more detail further below.

Due to the setting of a comparatively high fictive temperature the quartz glass cylinder obtained exhibits residual stresses which are above all noticed in the more rapidly cooling peripheral portion of the component. Therefore, a portion which pertains to the overdimension surrounding the contour of the optical component to be produced is removed from both faces of the cylinder. Due to the previous removal of this overdimension (or a part thereof), the loading duration during subsequent loading of the quartz glass cylinder with hydrogen is shortened, the loading duration being required for setting a mean hydrogen content ranging from $1\times10^{16}$ molecules/cm$^3$ to $1\times10^{17}$ molecules/cm$^3$.

It is known that hydrogen has a healing effect with respect to defects created by UV irradiation in quartz glass. In the method of the invention, the hydrogen content is however reduced to a considerable extent, e.g. due to the above-explained vacuum treatment of the soot body. Therefore, the quartz glass is subsequently loaded with hydrogen. Hydrogen loading takes place at a low temperature below 500° C. to reduce the formation of SiH groups. SiH groups in quartz glass are undesired because a so-called E' center and atomic hydrogen are formed therefrom upon irradiation with high-energy UV light. The E' center effects an increased absorption at a wavelength of 210 nm and is unfavorably noticed in the adjoining UV wavelength range as well. Due to thermodynamic conditions SiH groups are increasingly formed at elevated temperatures (500° C.-800° C.) in the presence of hydrogen, and the comparatively low OH content of the quartz glass also shifts the balance towards SiH formation.

Fluorine and/or oxygen is/are preferably used as a reagent for the saturation of the oxygen defects produced during thermal dehydration treatment.

Aftertreatment can be performed in another heating device than the preceding dehydration treatment so that it can be constructionally adapted to the presence of oxygen and/or fluorine, e.g. in that graphite parts are avoided inside the heating chamber. Oxygen shows an entirely inert behavior vis-à-vis the quartz glass. On the other hand, the reaction of fluorine with existing oxygen defects requires a lower activation energy and thus a lower thermal load of the soot body.

Since the reagent is not used for eliminating hydroxyl groups, but just for saturating the oxygen defects the number of which is comparatively low, the amount of reagent can also be kept small. In this respect it has turned out to be particularly advantageous when the amount of reagent supplied to the soot body during treatment is set such that a content of oxygen defects below $2\times10^{15}$ cm$^{-3}$ is obtained.

Drying of the soot body is preferably carried out at a temperature of at least 1200° C.

A high temperature shortens the treatment period needed for eliminating the hydroxyl groups to a content below 60 wt ppm.

It has turned out to be particularly advantageous when a mean hydroxyl group content in the range between 10 wt ppm and 30 wt ppm is set during drying.

The lower the hydroxyl group content of the soot body is after drying, the lower is the hydroxyl group content in the resulting quartz glass after vitrification, and the lower is the birefringence induced by anisotropic density change and experienced by the quartz glass during use with linearly polarized UV laser radiation. The said lower limit is due to the fact that on the basis of purely physical methods the dehydration treatment requires excessively high temperatures or treatment durations that have a disadvantageous effect on the quality of the quartz glass.

The annealing of the quartz glass blank primarily serves to reduce stresses, to adjust the desired fictive temperature, and thus serves a compaction-resistant glass structure, and it preferably comprises the following method steps:

holding the quartz glass blank for a first holding period of at least 4 hours at a first higher annealing temperature which is at least 50° C. above the fictive temperature of the quartz glass component to be set, cooling at a first lower cooling rate to a second lower annealing temperature which is in the range between +/−20° C. around the fictive temperature of the quartz glass component to be set, holding at the lower annealing temperature for a second holding period, and cooling to a predetermined final temperature below 800° C., preferably below 400° C., at a second higher cooling rate which is at least 25° C./h.

It has been found that a high fictive temperature is accompanied by the generation of a comparatively dense network structure which counteracts a further local compaction by UV irradiation and particularly an anisotropic density change by linearly polarized UV radiation. The above-indicated preferred annealing program includes heating to a temperature clearly above the fictive temperature (>50° C.), cooling to a temperature in the range around the fictive temperature to be set, and then comparatively rapid cooling of the quartz glass blank to a low temperature below which no essential changes in the glass structure are to be expected any more.

This is a comparatively short annealing method, which although it might entail drawbacks with respect to stress birefringence effects an enhanced stability with respect to local compaction by UV radiation and, apart from saving time, has the further advantage that due to the comparatively short treatment duration at a high temperature the formation of inhomogeneities due to out-diffusion of components and contaminations by diffusing impurities are avoided.

A particularly compact network structure is obtained when the first cooling rate is set in the range between 1° C./h and 10° C./h, and preferably to a value in the range between 3° C. and 5° C./h.

As for a compact glass structure, it has also turned out to be advantageous when the second cooling rate is set in the range between 25° C./h and 80° C./h, preferably above 40° C./h.

The faster the cooling process, the greater are the above-mentioned advantages with respect to saving time, reduction of diffusion effects and action of the "previously compacted" glass structure.

In a preferred embodiment of the method of the invention, the second holding time is between 1 hour and 16 hours.

The quartz glass is once again given the opportunity to relax. The temperature distribution inside the quartz glass blank is homogenized and thermal gradients that lead to stress birefringence are reduced.

In this connection the first holding time is preferably not more than 50 hours. It has been found that a longer annealing period for setting a glass structure close to the predetermined fictive temperature is not needed.

Advantageously, the quartz glass blank is loaded with hydrogen at a pressure between 0 and 1 bar.

An increased pressure accelerates hydrogen loading and may also have an effect on density in the sense of a more compact network structure that is more resistant to local anisotropic and isotropic density change.

For achieving a small formation of SiH groups a procedure is preferred in which the quartz glass blank is loaded with hydrogen at a temperature below 400° C., preferably below 350° C.

For the same reason it is preferred that during the hydrogen loading of the quartz glass cylinder a mean hydrogen content below $5\times10^{16}$ molecules/cm$^3$ is generated, and preferably in the range between $2\times10^{16}$ and $5\times10^{16}$ molecules/cm$^3$, since a high hydrogen content can contribute to the generation of SiH groups.

The optical quartz glass component of the invention or the optical component produced according to the method of the invention is characterized by low sensitivity to a local anisotropic and isotropic density change upon irradiation with short-wave UV radiation. Therefore, it is preferably used as an optical component in a projection system of an automatic exposure machine for immersion lithography for the purpose of transmitting ultraviolet, pulsed and linearly polarized UV laser radiation of a wavelength between 190 nm and 250 nm.

The quartz glass component has turned out to be particularly stable with respect to UV laser radiation of this wavelength if it has an energy density of less than 600 μJ/cm$^2$, preferably less than 150 μJ/cm$^2$, and a pulse width in time of 50 ns or more, preferably 150 ns or more.

Figure 2:
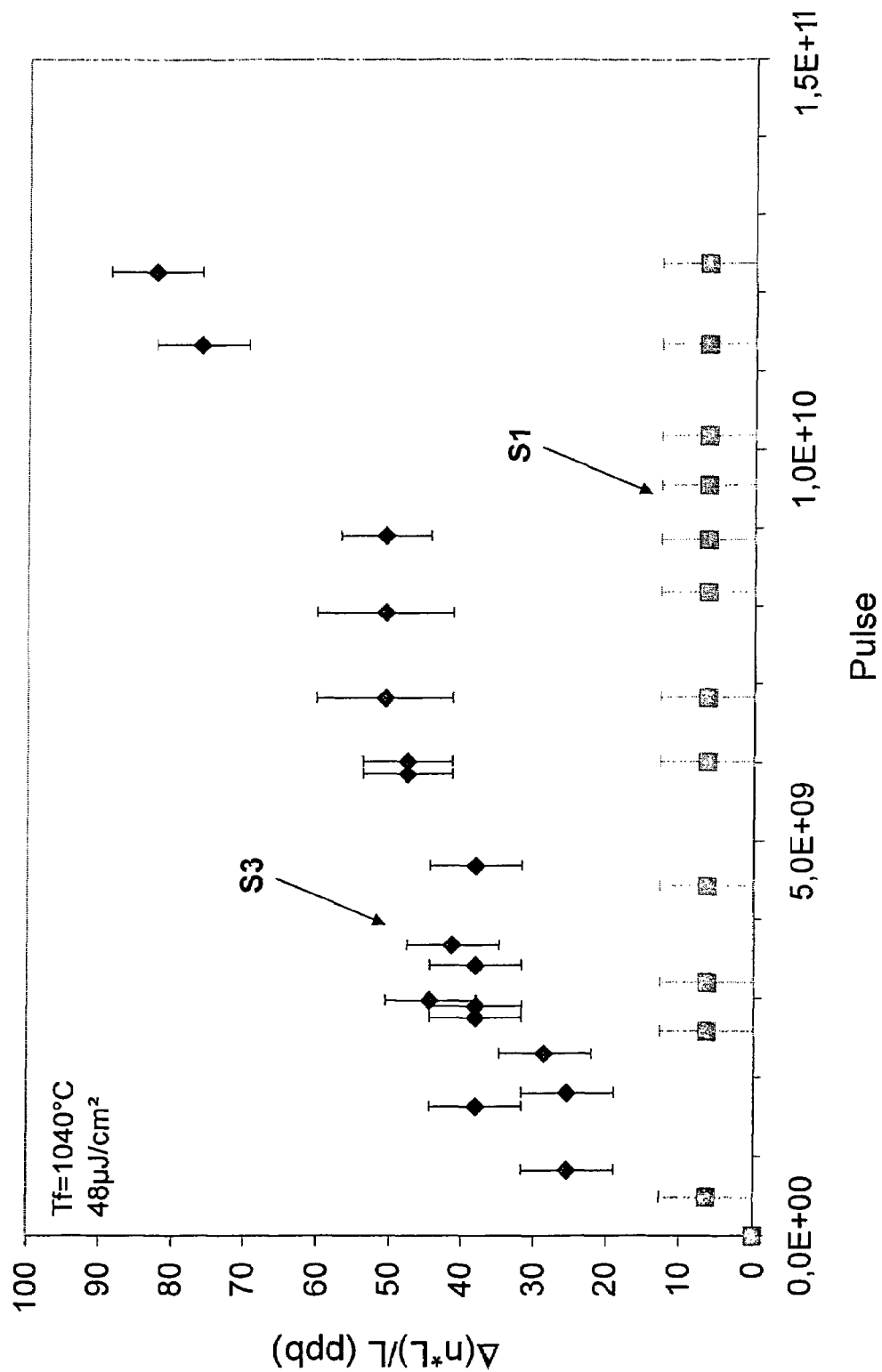
Figure 3:
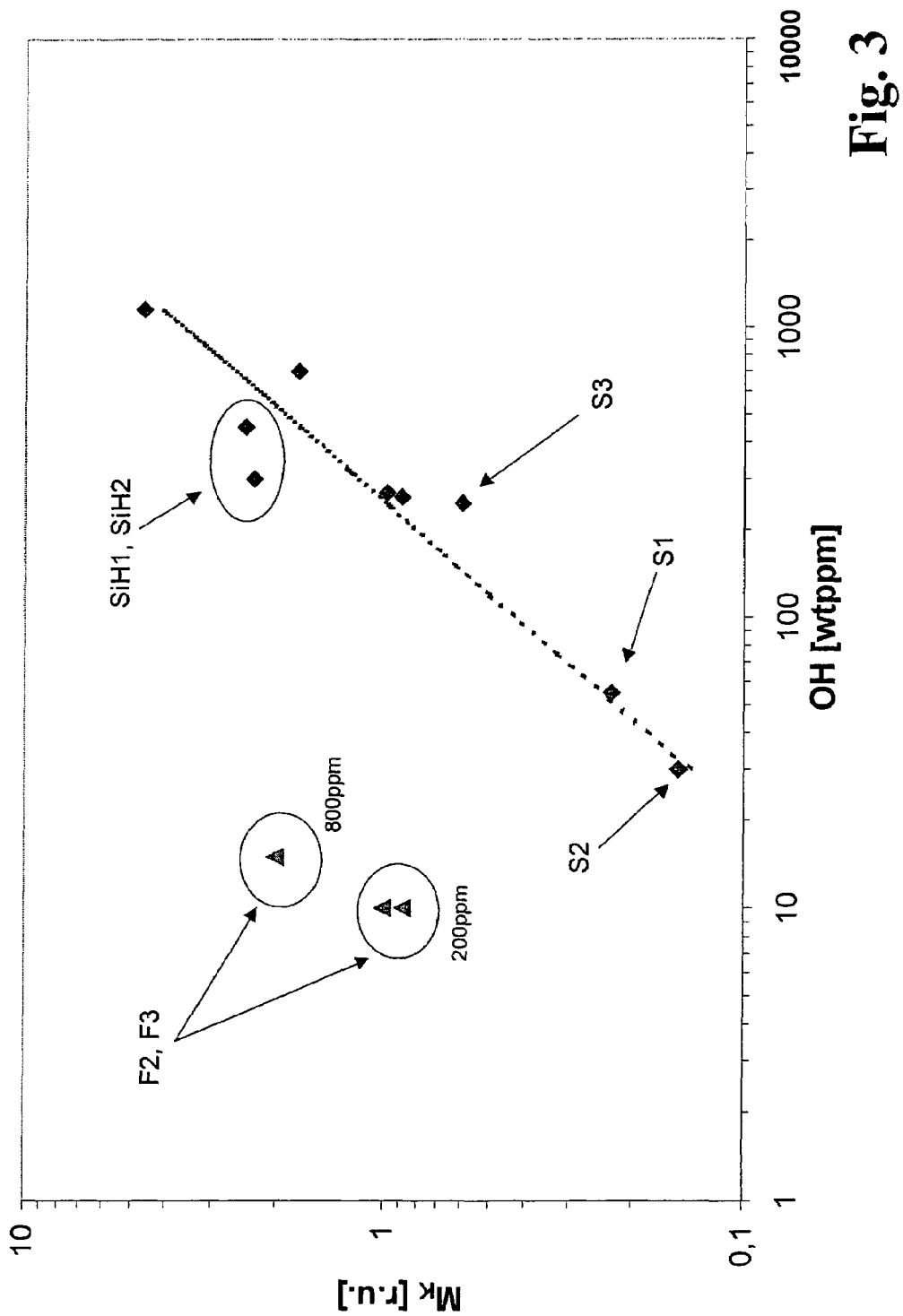

The invention shall now be explained in more detail with reference to embodiments and a drawing, in which FIG. 1 is a diagram showing the dependence of the birefringence induced by UV radiation through the anisotropic density change, on the hydroxyl group content of the quartz glass;

FIG. 2 is a diagram showing the dependence of the refractive index change induced by UV radiation, on the pulse number of the radiation in the case of quartz glass qualities differing in their hydroxyl group content; and FIG. 3 is a diagram showing the dependence of the refractive index change induced by UV radiation, on the hydroxyl group content of the quartz glass.

SAMPLE PREPARATION, SAMPLE S1

A soot body is produced by flame hydrolysis of $SiCl_4$ with the help of the known OVD method. The soot body is dehydrated at a temperature of 1200° C. in a heating furnace with a heating element of graphite in vacuum. The graphite found in the heating furnace effects the setting of reducing conditions. Upon completion of the dehydration treatment after 50 hours the hydroxyl group content of the soot body is about 48 wt ppm. The quartz glass of the soot body contains oxygen defects in the order of $1.7\times10^{16}$ cm$^{-3}$. The above-mentioned Shelby method is no longer suited for quantitatively determining such a low concentration. Therefore, the oxygen defects were indirectly determined through the transmission loss. The transmission loss is here caused by the separation of the oxygen defects under laser irradiation into two so-called E' centers, which show a typical absorption at a wavelength of 210 nm.

The dried soot body is then introduced into a doping furnace and treated therein at a temperature of 1100° C. for 20 hours in an atmosphere consisting of 20% oxygen, the rest being inert gas. This treatment is configured such that the existing oxygen defects are saturated and removed down to below the detection limit.

The dried and after-treated soot body is then vitrified in a sintering furnace at a temperature of about 1750° C. in vacuum ($10^{-2}$ mbar) to obtain a transparent quartz glass blank. This blank is subsequently homogenized by thermally mechanical homogenization (twisting) and formation of a quartz glass cylinder. Thereafter the hydroxyl group content of the quartz glass cylinder continues to be about 48 wt ppm.

For reducing mechanical stresses and birefringence and for producing a compaction-resistant glass structure, the quartz glass cylinder is subjected to an annealing treatment which is particularly characterized by its shortness. The quartz glass cylinder is here heated to 1130° C. in air and at atmospheric pressure for a holding time of 8 hours and then cooled at a cooling rate of 4° C./h to a temperature of 1050° C. and held at this temperature for 4 hours. Thereupon, the quartz glass cylinder is cooled at a higher cooling rate of 50° C./h to a temperature of 300° C., whereupon the furnace is switched off and the quartz glass cylinder is left to the free cooling of the furnace.

The quartz glass cylinder treated in this way has an outer diameter of 350 mm and a thickness of 60 mm. The quartz glass has a mean fictive temperature of 1055° C. It has been found that the cylinder exhibits relatively strong stress birefringence probably due to the rapid cooling from the temperature of 1050° C., particularly in its peripheral portions. Part of the overdimension with respect to the component contour, namely a thickness of 3 mm, is removed from the faces of the quartz glass cylinder before the next treatment step.

Thereupon, the quartz glass cylinder is held in a pure hydrogen atmosphere at 380° C., first at an absolute pressure of 1 bar for a duration of 314 hours, and then at this temperature for 393 hours at a hydrogen partial pressure of 0 bar, and thereafter at an absolute pressure of 0.1 bar for a duration of 79 hours.

The quartz glass cylinder obtained thereafter is substantially free of chlorine, oxygen defects and SiH groups (below the detection limit of $5 \times 10^{16}$ molecules/cm$^3$), and it is characterized within a diameter of 280 mm (CA area) by a mean hydrogen content of $3 \times 10^{16}$ molecules/cm$^3$, a hydroxyl group content of 48 wt ppm and a mean fictive temperature of 1055° C. The fluorine content is below 5 wt ppm.

Sample Preparation, Sample S2

Another quartz glass cylinder is produced, as described above with reference to sample S1, but with the following differences:

the soot body is dehydrated at a temperature of 1200° C. in a heating furnace with a heating element of graphite in vacuum, the dehydration treatment being only completed after 100 hours. Thereafter the hydroxyl group content of the soot body is about 30 wt ppm. The quartz glass of the soot body contains oxygen defects in the order of $3 \times 10^{16}$ molecules/cm$^3$.

The dried soot body is then introduced into a doping furnace and treated therein at a temperature of 24° C. for 20 hours in a fluorine atmosphere. This treatment is devised such that the existing oxygen defects are saturated and removed down to below the detection limit.

The soot body is then vitrified and subjected to further treatment, as described with reference to sample S1. The resulting quartz glass cylinder is substantially free from chlorine, oxygen defects and SiH groups (below the detection limit of $5 \times 10^{16}$ molecules/cm$^3$), and it is distinguished within a diameter of 280 mm (CA area) by a mean hydrogen content of about $3 \times 10^{16}$ molecules/cm$^3$, a hydroxyl group content of 30 wt ppm and a mean fictive temperature of 1075° C. Despite the fluorine treatment, the fluorine content is below 5 wt ppm.

The measurement samples S1 and S2 are made from the quartz glass cylinders produced in this way for determining the resistance of the quartz glass to irradiation with linearly polarized UV excimer laser radiation of a wavelength of 193 nm.

Comparative Samples S3, F1, F2, F3, SiH1 AND SiH2

The comparative samples S3, F1, F2, F3, SiH1 and SiH2, whose typical features shall be explained in the following, were subjected to the same measurements.

Sample S3 corresponds to a quartz glass produced according to a standard soot method, which is e.g. described in more detail in DE 101 59 962. A hydroxyl group content of about 250 wt ppm to 350 wt ppm is typical of such a quartz glass quality.

The quartz glass samples F1 to F3 exhibit commercially available quartz glass qualities with a fluorine content of at least 200 wt ppm, the quartz glass being each time loaded with hydrogen at a low temperature, as has been described above.

The comparative samples SiH1 and SiH2 substantially correspond to sample S3, but have a hydrogen content that is higher at the beginning, and are subsequently loaded with hydrogen at temperatures around 1000° C., resulting in an enhanced SiH formation.

Measurement Results

It is already described in the earlier above-mentioned German patent application DE 10 2004 017 031 that at different quartz glass qualities an approximately linear increase is observed in the birefringence [nm/cm] induced by anisotropic density change with the dose of the transmitted UV radiation, the dose being characterized by way of the product from the energy density of the UV radiation in µJ/cm$^2$ and the pulse number. The slope of the product-specific straight line is a measure of the sensitivity of the quartz glass in question to linearly polarized UV radiation with respect to anisotropic changes in its density.

Corresponding tests were carried out for a great number of quartz glass samples which, apart from their hydroxyl group content, here sample S3 with a hydroxyl group content of 300 wt ppm, also differ in the fluorine content. The test results are summarized in the diagram of FIG. 1. The slope (sensitivity) of the above-explained product-specific straight line is plotted on the y-axis, and the respective OH content of the samples in wt ppm is plotted on the x-axis.

As can clearly be seen, the slope "DBZ/dose" (sensitivity) is strongly scaled with the OH content of the samples. This means that with an increasing OH content the sensitivity of the quartz glass samples increases with respect to an anisotropic density change upon irradiation with linearly polarized laser light radiation of a wavelength of 193 nm. The samples designated by F1 (fluorine content >10000 wt ppm), F2 (fluorine content=200 wt ppm) and F3 (fluorine content=800 wt pm), which are each characterized by a comparatively high fluorine content deviate upwards from the compensation curve (dotted line) calculated (without said samples). Hence, they show a higher sensitivity to linearly polarized UV radiation as would have been expected because of the hydroxyl group content alone.

The corresponding radiation resistance of the fluorine- and chlorine-poor quartz glass samples S1 (with an OH content of 48 wt ppm) and S2 (with an OH content of 30 wt ppm) can be regarded as excellent.

The diagram of FIG. 2 shows the wavefront distortion, indicated as a change in the refractive index based on the distance ΔnL/L in ppb, depending on the pulse number upon irradiation of two different quartz glass samples (sample S1 and a comparative sample S3 with a hydroxyl group content of 300 wt ppm, each at the same fictive temperature of 1040° C.). These samples were exposed to linearly polarized UV radiation of a wavelength of 193 nm, at a pulse width of 25 ns and an energy density of 48 µJ/cm$^2$, and the wavefront distortion produced thereby was measured from time to time.

As can be seen therefrom, the wavefront distortion at an increasing pulse number in sample S3 with the high hydroxyl group content is at a distinctly higher level than in sample S1 with the lower hydroxyl group content. This demonstrates that the isotropic portion of the density change due to linearly polarized radiation depends on the hydroxyl group content of the respective quartz glass.

The dependence of the wavefront distortion on the pulse number, as shown in FIG. 2, can be described for each quartz glass quality by means of an individual measure which characterizes the compaction sensitivity of the quartz glass to UV radiation.

Such an absolute measure $M_K$ is plotted on the y-axis of the diagram of FIG. 3 versus the hydroxyl group content of the quartz glass in wt ppm (x-axis). This yields an approximately linear dependence of the compaction sensitivity (MK) on the hydroxyl group content. The outliers F1 and F2 and SiH1 and SiH2, respectively, stand for the above-mentioned quartz glass samples with a high fluorine content and for quartz glass samples with an Si—H content of $1.7 \times 10^{17}$ molecules/cm$^3$ (SiH1) and of $2 \times 10^{17}$ molecules/cm$^3$ (SiH2), respectively. These quartz glass qualities show a comparatively high compaction sensitivity to the quartz glass samples S1 an S2 according to the present invention.

Optical components made from a quartz glass quality in accordance with samples S1 and S2 are particularly suited for use in a projection system of an automatic exposure machine for immersion lithography for the purpose of transmitting ultraviolet, pulsed and linearly polarized UV laser radiation of a wavelength between 190 nm and 250 nm.

First tests for checking the dependence of radiation damage on the pulse width of the transmitted laser light suggest that broader pulses with a pulse width of 50 ns (in comparison with a pulse width of 25 ns) permit the use of the quartz glass component of the invention at higher energy densities or pulse numbers.

The invention claimed is:

1. An optical component configured for use in a projection lens system for immersion lithography with an operating wavelength below 250 nm, said component comprising quartz glass having:
    a glass structure essentially without oxygen defects,
    a mean hydrogen content in a range between $1 \times 10^{16}$ and $1 \times 10^{17}$ molecules/cm$^3$,
    a mean content of SiH groups of less than $5 \times 10^{16}$ molecules/cm$^3$,
    a mean content of hydroxyl groups of less than 60 wt ppm,
    a mean content of fluorine of less than 10 wt ppm,
    a mean content of chlorine of less than 1 wt ppm, and
    a fictive temperature above 1040° C.

2. The component according to claim 1, wherein the fictive temperature of the quartz glass is above 1080° C.

3. The component according to claim 1, wherein the mean content of hydroxyl groups of the quartz glass is between 10 and 30 wt ppm.

4. The component according to claim 1, wherein the mean content of fluorine of the quartz glass is less than 5 wt ppm.

5. The component according to claim 1, wherein the mean hydrogen content of the quartz glass is below $5 \times 10^{16}$ molecules/cm$^3$.

6. The component according to claim 1, wherein the mean hydrogen content of the quartz glass is between $2 \times 10^{16}$ and $5 \times 10^{16}$ molecules/cm$^3$.

* * * * *